(12) United States Patent
Matheisen et al.

(10) Patent No.: US 11,931,989 B2
(45) Date of Patent: Mar. 19, 2024

(54) COMPOSITE PANE WITH A CUTOUT IN THE INNER PANE

(71) Applicant: SAINT-GOBAIN GLASS FRANCE, Courbevoie (FR)

(72) Inventors: Christopher Matheisen, Herzogenrath (DE); Dirk Wohlfeil, Raeren (BE); Gabor Varga, Herzogenrath (DE); Michael Kolf, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 346 days.

(21) Appl. No.: 17/607,186

(22) PCT Filed: Apr. 16, 2020

(86) PCT No.: PCT/EP2020/060728
§ 371 (c)(1),
(2) Date: Oct. 28, 2021

(87) PCT Pub. No.: WO2020/221597
PCT Pub. Date: Nov. 5, 2020

(65) Prior Publication Data
US 2022/0219432 A1    Jul. 14, 2022

(30) Foreign Application Priority Data

Apr. 30, 2019    (EP) .................................. 19171753

(51) Int. Cl.
*B32B 15/04*        (2006.01)
*B32B 3/30*         (2006.01)
(Continued)

(52) U.S. Cl.
CPC ......... *B32B 17/10348* (2013.01); *B32B 3/30* (2013.01); *B32B 17/10036* (2013.01);
(Continued)

(58) Field of Classification Search
CPC ........................... B32B 3/30; B32B 17/10036
(Continued)

(56) References Cited

U.S. PATENT DOCUMENTS

| | | |
|---|---|---|
| 2005/0188634 A1 | 9/2005 | Bolton et al. |
| 2007/0154705 A1 | 7/2007 | Doeppner et al. |

(Continued)

FOREIGN PATENT DOCUMENTS

| | | |
|---|---|---|
| CA | 3049164 A1 | 9/2018 |
| CN | 101454155 A | 6/2009 |

(Continued)

OTHER PUBLICATIONS

International Search Report as issued in International Patent Application No. PCT/EP2020/060728, dated Jul. 10, 2020.

*Primary Examiner* — Lauren R Colgan
(74) *Attorney, Agent, or Firm* — Pillsbury Winthrop Shaw Pittman LLP

(57) ABSTRACT

A composite pane includes an outer pane and an inner pane which are joined to one another via a first thermoplastic intermediate layer arranged directly adjacent the outer pane and a second thermoplastic intermediate layer arranged directly adjacent the inner pane, and an inlay element which is arranged in a region of the composite pane between the first thermoplastic intermediate layer and the second thermoplastic intermediate layer. The inner pane has a cutout and the second thermoplastic intermediate layer has a cutout. The cutout of the second thermoplastic intermediate layer is, when looked through, arranged completely within the region in which the inlay element is arranged, and the (Continued)

Figure 1:
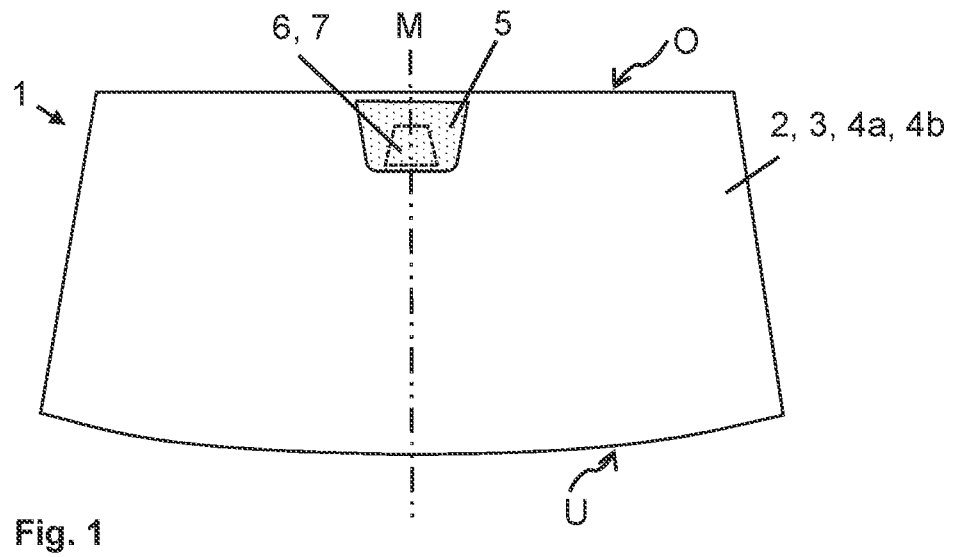

cutout of the inner pane is, when looked through, arranged completely within the cutout of the second thermoplastic intermediate layer.

20 Claims, 8 Drawing Sheets

(51) Int. Cl.
*B32B 17/06* (2006.01)
*B32B 17/10* (2006.01)

(52) U.S. Cl.
CPC .. *B32B 17/10357* (2013.01); *B32B 17/10385* (2013.01); *B32B 17/10935* (2013.01); *B32B 17/10779* (2013.01); *B32B 2307/202* (2013.01); *B32B 2307/402* (2013.01); *B32B 2307/41* (2013.01); *B32B 2605/006* (2013.01)

(58) Field of Classification Search
USPC .................................................. 428/426, 428
See application file for complete search history.

(56) References Cited

U.S. PATENT DOCUMENTS

| | | | |
|---|---|---|---|
| 2019/0018277 A1* | 1/2019 | Berner | B32B 17/10036 |
| 2019/0389181 A1* | 12/2019 | Hennion | B32B 17/10761 |

FOREIGN PATENT DOCUMENTS

| | | |
|---|---|---|
| CN | 107614302 A | 1/2018 |
| CN | 109496205 A | 3/2019 |
| DE | 689 02 172 T2 | 2/1993 |
| DE | 93 13 394 U1 | 10/1993 |
| DE | 42 35 063 A1 | 4/1994 |
| DE | 20 2004 019 286 U1 | 4/2006 |
| DE | 10 2007 042 028 A1 | 3/2008 |
| DE | 10 2012 018001 A1 | 5/2013 |
| DE | 20 2019 102 137 U1 | 4/2019 |
| WO | WO 2016/208370 A1 | 12/2016 |
| WO | WO 2018/115090 A1 | 6/2018 |
| WO | WO 2018/142078 A1 | 8/2018 |
| WO | WO 2018/168469 A1 | 9/2018 |
| WO | WO 2018/178883 A1 | 10/2018 |

* cited by examiner

COMPOSITE PANE WITH A CUTOUT IN THE INNER PANE

CROSS-REFERENCE TO RELATED APPLICATIONS

This application is the U.S. National Stage of PCT/EP2020/060728, filed Apr. 16, 2020, which in turn claims priority to European patent application number 19171753.7 filed Apr. 30, 2019. The content of these applications are incorporated herein by reference in their entireties.

The invention relates to a composite pane with a cutout in the inner pane, a method for its production, and its use.

Modern vehicles are equipped with an increasing number of sensors whose signals are used, for example, to assist the driver. Examples of such sensors include optical sensors, such as cameras, for example, video cameras or night vision cameras, rain sensors, light sensors, or distance meters. Forward-directed sensors are frequently secured on the interior-side surface of the windshield, typically centrally near the upper edge. In the prior art, the sensors are obscured by an opaque masking print on the windshield. For this, the customary, peripheral, frame-like masking print, which primarily serves as UV protection for the assembly adhesive of the windshield, is significantly enlarged in the direction of the center of the pane in the region of the sensors.

Conventional sensors are mounted on the windshield such that their detection direction runs horizontally. Since the windshield is installed in the vehicle greatly inclined, for example, at an installation angle of 60° relative to the vertical, the detection direction of the sensor encloses a very acute angle of approx. 30° with the windshield. This yields a relatively large, substantially trapezoidal, so-called "sensor window" of the windshield. The sensor window is that region of the windshield through which radiation passing through is detected by the sensor. The sensor window of the windshield is, thus, the region that lies in the detection bean path of the sensor.

The more sensors to be secured on the pane, the more area of the windshield is occupied by the total of the sensor windows, and the larger the masking print intended to obscure the sensors has to be.

During the production of a composite pane, the masking print is applied on the outer pane or the inner pane by screen printing before the bending of the individual panes. During the bending process, which is usually carried out at temperatures from 500° C. to 700° C., the heat is absorbed more by the screen print than by the respective pane. This can result in optical distortions of sensor windows surrounded by screen printing, in particular black printing, and/or in glass breakage.

The sensor windows should be kept free of ice or fog. This can be made possible, for example, by heatable sensor windows. For this purpose, heating wires are, for example, laminated into the region of the sensor windows. Such laminated-in heating wires are, however, disadvantageous for the optical quality of the sensor windows.

Nowadays, sensors, heating elements, and antennas are applied to the inside of the inner pane or incorporated in the laminate; and the masking print to conceal the sensors, heating elements, and antennas is applied in a separate step and as a separate layer. In addition, the individual functional elements, i.e., the sensors, heating elements, or antennas are applied or incorporated individually.

To improve the optical properties of the sensor window, the inner pane can have a cutout in the region of the sensor window. Composite panes with a cutout in the inner pane are disclosed, for example, in WO 2018/142078 A1, WO 2018/178883 A1, WO 2016/208370 A1, and DE 10 2007 042 028 A1. However, such a cutout in the inner pane of a composite pane consisting of an outer pane, an inner pane, and at least one thermoplastic intermediate layer is accompanied by losses in terms of the stability of the composite pane.

DE 20 2019 102 137 U1 discloses composite panes with a cutout in the thermoplastic intermediate layer.

The object of the present invention is to provide an improved composite pane in which the risk of glass breakage during the bending process is reduced, in which the optical quality in the region of an existing sensor window is improved, which is stabilized mechanically, and in which, optionally, one or more electrically conductive elements are incorporated.

The object of the present invention is accomplished according to the invention by a composite pane in accordance with claim 1. Preferred embodiments are apparent from the subclaims.

The composite pane according to the invention comprises at least an outer pane and an inner pane, a first thermoplastic intermediate layer, a second thermoplastic intermediate layer, end an inlay element, wherein the first thermoplastic intermediate layer is arranged directly adjacent the outer pane, the second thermoplastic intermediate layer is arranged directly adjacent the inner pane, and the inlay element is arranged between the first thermoplastic intermediate layer and the second thermoplastic intermediate layer.

The inlay element is arranged only in one region of the composite pane, i.e., in terms of its outer dimensions, it is smaller than the composite pane and thus does not extend over the entire composite pane. Preferably, the inlay element extends over a maximum of 50%, particularly preferably over a maximum of 30%, most particularly over a maximum of 10% of the area of the composite pane.

According to the invention, the inner pane has a cutout and the second thermoplastic intermediate layer also has a cutout. According to the invention, when looked through, the cutout in the second thermoplastic intermediate layer is arranged completely within the region in which the inlay element is arranged. According to the invention, when looked through, the cutout in the inner pane is arranged completely within the cutout in the second thermoplastic intermediate layer.

The outer pane, the inner pane, the first thermoplastic intermediate layer, and the second thermoplastic intermediate layer have substantially the same outer dimensions, They thus extend substantially over the entire length and width of the composite pane according to the invention, wherein the second thermoplastic intermediate layer and the inner pane have a cutout in each case, as described above, and the first thermoplastic intermediate layer and the outer pane have no cutout.

The outer pane and the inner pane are typically made of glass. The composite pane is, in particular, a vehicle composite pane and is thus intended for separating a vehicle interior from an external environment. The composite pane is thus a window pane that is inserted in a window opening of the vehicle body or is intended for this. The composite pane according to the invention is in particular a windshield of a motor vehicle.

The term "inner pane" refers to that pane that is intended to face the interior of the vehicle in the installed position. "Outer pane" refers to that pane that is intended to face the external environment of the vehicle in the installed position. That surface of the respective pane that faces the external environment of the vehicle in the installed position is referred to as the exterior-side surface. That surface of the respective pane that faces the interior of the vehicle in the installed position is referred to as the interior-side surface.

The region of the composite pane that is arranged in the detection beam path of a sensor or is intended for that purpose is referred to as the sensor region or sensor window. Radiation that passes through the composite pane in the sensor window is detected by the sensor.

Preferably, the cutout in the inner pane is suitable as a sensor window for an optical sensor.

When the sensor is a camera, the region of the composite pane that is arranged in the detection beam path or is intended for that purpose can also be referred to as the camera region or the camera window. Radiation that passes through the composite pane in the camera window is detected by the camera.

In one embodiment of the composite pane according to the invention, the inlay element comprises a substrate layer and an opaque layer, wherein the opaque layer has a cutout which, when looked through, is arranged completely within the cutout in the inner pane. The substrate layer is preferably transparent. Preferably, the cutout in the substrate layer is a sensor window for an optical sensor. Optionally, in this embodiment of a composite pane according to the invention, when looked through, an electrically conductive element implemented as an electrically heatable element is arranged at least in the region of the cutout in the opaque layer. The optional electrically conductive element implemented as an electrically heatable element can also be implemented as an electrically conductive layer or coating that is applied over the entire surface of the substrate layer.

Preferably, the opaque layer is arranged directly adjacent the first thermoplastic layer.

In another embodiment of the composite pane according to the invention, the inlay element comprises a substrate layer that is opaquely colored in some regions and has a region that is excluded from the opaque coloring, i.e., Is not opaquely colored and is thus transparent. The region excluded from the opaque coloring is, when looked through, arranged completely within the cutout in the inner pane. Preferably, the region of the substrate layer excluded from the opaque coloring is a sensor window for an optical sensor. Optionally, in this embodiment of a composite pane according to the invention, when looked through, an electrically conductive element implemented as an electrically heatable element is arranged at least in the region that is excluded from the opaque coloring. The optional electrically conductive element implemented as an electrically heatable element can also be implemented as an electrically conductive layer or coating that is applied to the entire surface of the substrate layer.

In preferred embodiments of the composite pane according to the invention, as described above, the cutout in the opaque layer or the region of the substrate layer excluded from the opaque coloring is a sensor window for an optical sensor.

The area of the cutout in the opaque layer or the area of the region of a substrate layer colored in some regions excluded from the opaque coloring preferably corresponds at least to the size of the sensor window required for the respective sensors, particularly preferably exactly to the size of the sensor window required for the respective sensors. The cutout in the opaque layer or the area of the region of a substrate layer colored in some regions preferably has an area of at least 1 cm$^2$, particularly preferably of 1 cm$^2$ to 500 cm$^2$, most particularly preferably of 10 cm$^2$ to 250 cm$^2$, in particular of 20 cm$^2$ to 100 cm$^2$, for example, 35 cm$^2$, The sensor window is, for example, between 7 cm and 10 cm high and between 8 cm and 40 cm wide.

In one embodiment, the cutout in the opaque layer or the region of a substrate layer colored in some regions excluded from the opaque coloring is trapezoidal. A trapezoidal cutout or a trapezoidal region excluded from the opaque coloring is, in particular, suitable as a sensor window for a camera. In another embodiment, the cutout in the opaque layer or the region of a substrate layer colored in some regions excluded from the opaque coloring is circular or oval. A circular or oval cutout or a region excluded from the opaque coloring is, in particular, suitable as a sensor window for a rain sensor.

As described above, when looked through, the cutout in the inner pane is arranged completely within the cutout in the second thermoplastic intermediate layer; and, when looked through, the cutout in the opaque layer or the region of a substrate layer opaquely colored in some regions excluded from the opaque coloring is arranged completely within the cutout of the inner pane.

Thus, in one embodiment, the cutout in the inner pane, the cutout in the second thermoplastic intermediate layer, and the cutout in the opaque layer or the region of the substrate layer opaquely colored in some regions excluded from the opaque coloring have the same outer dimensions and lie congruently one atop another, when looked through.

In a preferred embodiment, the cutout in the second thermoplastic intermediate layer prior to lamination of the composite pane is larger in dimensions than the cutout in the inner pane, wherein, when looked through, the cutout in the inner pane is preferably arranged substantially centrally in the cutout in the second thermoplastic intermediate layer. For example, the distance between the inner edge of the second thermoplastic layer and the inner edge of the inner pane prior to lamination is 5 mm to 10 mm. This prevents the second thermoplastic intermediate layer from flowing into the cutout in the inner pane during lamination. Alternatively, flowing in of the second thermoplastic intermediate layer during lamination can also be prevented by a barrier at the inner edge of the second thermoplastic intermediate layer. Such a barrier can, for example, be formed by Teflon strips and can, optionally, be removed from the composite pane after lamination.

In another preferred embodiment, the cutout in the opaque layer or the region of the substrate layer opaquely colored in some regions excluded from the opaque coloring is smaller in dimensions than the cutout in the inner pane, wherein, when looked through, the cutout in the opaque layer or in the region excluded from the opaque coloring is preferably arranged substantially centrally in the cutout in the inner pane. For example, the distance from the inner edge of the opaque layer or from the inner edge of the region that is opaquely colored to the inner edge of the inner pane is 5 mm to 50 mm, preferably, 7 mm to 10 mm. Thus, when looked through from the outside, the inner edge of the inner pane is concealed by the opaque layer or the opaquely colored region of a substrate layer opaquely colored in some regions.

The composite pane according to the invention is in particular intended and suitable for an optical sensor to be secured on the pane that constitutes the inner pane in the installed position. For this purpose, the interior-side surface of the inner pane can be equipped with suitable mounts, for example, with a bracket or a housing. The optical sensor secured to the inner pane is preferably aimed toward the cutout in the inner pane.

The optical sensors secured to the pane are preferably cameras, such as video cameras or night vision cameras, rain sensors, light sensors, distance meters, or LIDAR (light detection and ranging) systems. If there is more than one optical sensor secured to the pane, the type of the individual optical sensors can even be different.

The substrate layer present in the inlay element can also be implemented as an electrically conductive substrate layer. In this case, the substrate layer contains or consists of an electrically conductive polymer. Examples of conductive and thus heatable polymers include poly-3,4-ethylenedioxythiophene (PEDOT) with polystyrene sulfonate (PSS) as counterion, doped polyacetylene (PAC), and polyaniline (PAni).

In a preferred embodiment of the composite pane accordin e invention, the inlay element has at least one electrically conductive element.

Thus, in one embodiment, the inlay element comprises a substrate layer, an opaque layer, and at least one electrically conductive element, wherein the opaque layer has a cutout which is, when looked through, arranged completely within the cutout in the inner pane. The at least one electrically conductive element can be arranged directly adjacent the substrate layer, directly adjacent the opaque layer, or between the substrate layer and the opaque layer.

In another embodiment, the inlay element comprises a substrate layer which is opaquely colored in some regions and at least one electrically conductive element, wherein the substrate layer has a region which is excluded from the opaque coloring and, when looked through, is arranged completely within the cutout in the inner pane. The at least one electrically conductive element is, in this case, arranged directly adjacent the substrate layer.

The at least one electrically conductive element can be implemented, independently of one another, for example, as an electrically heatable element, a moisture sensor, a pressure sensor, an antenna, or a printed circuit board, i.e., a carrier for electronic lines and components.

Examples of antennas include antennas for radio-frequency identification (RFID), radio detection and ranging (RADAR), 5G, long term evolution (LTE), global system for mobile communication (GSM), global positioning system (GPS), radio (FM, DAB), industrial, scientific, and medical band (ISM bands), and wireless local area network (WLAN).

In one embodiment of the composite pane according to the invention, the inlay element has at least two electrically conductive elements that are structured differently.

The substrate layer and, if present, the opaque layer of the inlay element have substantially the same outer dimensions. They thus extend substantially over the entire length and width of the inlay element.

"Substantially the same outer dimensions" means that the outer dimensions of two materials deviate from one another by at most 5%, preferably by 3%, particularly preferably by at most 2%.

The optionally present at least one electrically conductive element extends over the entire surface or only in sections in the inlay element.

If the inlay element has, for example, only one electrically conductive element that is implemented in the form of an electrically heatable layer or coating, this electrically heatable layer or coating extends either over the entire surface or in sections in the inlay element, i.e., the electrically heatable layer or coating is arranged over the entire surface or substantially over the entire surface or in sections on the substrate layer or on the substrate layer and the opaque layer.

The at least one electrically conductive element can be an electrically heatable coating, a carbon-containing layer, or a metallic layer. Alternatively, the at least one electrically conductive element can contain or be made of a conductive polymer. It is known to the person skilled in the art which materials are suitable as electrically conductive elements. For example, the at least one electrically conductive element can be an indium tin oxide (ITO) layer or coating, a layer or coating containing silver or a silver-containing alloy, a layer or coating containing gold, aluminum, or tungsten, a graphite-containing layer or coating, or graphene. Examples of conductive and thus heatable polymers include poly-3,4-ethylenedioxythiophene (PEDOT) with polystyrene sulfonate (PSS) as counterion, doped polyacetylene (PAC), and polyaniline (PAni).

The electrically conductive element is preferably between 5 μm and 50 μm thick, particularly preferably between 5 μm and 20 μm, most particularly preferably between 8 μm and 15 μm. If the electrically conductive element is implemented, for example, as an electrically heatable layer, it is, for example, 10 μm thick. The electrically conductive element does not necessarily have to have a constant thickness over its entire area. The functional properties of the electrically conductive element can be influenced by varying the thickness and the structuring of the electrically conductive element.

In embodiments in which the conductive element is applied as a coating on the substrate layer, the conductive element is preferably between 10 nm and 5000 nm thick, preferably between 10 nm and 100 nm.

In a preferred embodiment, the substrate layer contains or consists of polyethylene terephthalate (PET), polymethyl methacrylate (PMMA), polypropylene (PP), or polyethylene (PE). Particularly preferably, the substrate layer contains or is made of PET.

The substrate layer is preferably between 50 μm and 150 μm thick, particularly preferably between 50 μm and 100 μm, most particularly preferably between 60 μm and 80 μm. The substrate layer is, for example, 50 μm thick.

As explained above, the substrate layer can be opaquely colored in some regions.

In a preferred embodiment, the opaque layer of the functional inlay element contains polyethylene terephthalate (PET) or polyethylene (PE) or ethylene vinyl acetate copolymer (EVA), in particular PET. In a particularly preferred embodiment, the opaque layer of the functional inlay element is made of polyethylene terephthalate (PET) or polyethylene (PE), in particular of PET.

The opaque layer is preferably between 50 μm (micrometers) and 200 μm thick; particularly preferably, it has the same thickness as the transparent substrate layer.

In embodiments in which the opaque layer is implemented as an opaque coating on the substrate layer, the opaque coating is preferably 5 μm to 15 μm thick.

It goes without saying that the opaque layer can also be implemented as an opaque coating of the transparent substrate layer. Suitable opaque coatings and printing methods for applying the opaque coating to the substrate layer are known to the person skilled in the art.

In preferred embodiments, the opaque layer or the opaquely colored region of the transparent substrate layer is, at least in sections, transparent to infrared radiation having a wavelength in the range between 800 nm and 1560 nm. In these embodiments, the opaque layer or the opaquely colored region of the transparent substrate layer is thus transparent, at least in sections, to radiation of infrared sensors or light detection and ranging (LiDaR) sensors.

The first thermoplastic intermediate layer and the second thermoplastic intermediate layer preferably contain, independently of one another, ethylene vinyl acetate (EVA), polyvinyl butyral (PVB), or polyurethane (PU) or mixtures or copolymers or derivatives thereof, particularly preferably PVB, The thickness of the first thermoplastic intermediate layer and the second thermoplastic intermediate layer is, independently of one another, preferably from 0.2 mm to 2 mm, particularly preferably from 0.3 mm to 1 mm, for example, 0.38 mm or 0.76 mm. In one embodiment, the thickness of the first thermoplastic intermediate layer is between 20 µm and 120 µm, preferably between 30 µm and 90 µm, particularly preferably between 50 µm and 75 µm, and most particularly preferably 50 µm.

The first thermoplastic intermediate layer and/or the second thermoplastic intermediate layer can also be sprayed onto the substrate layer or the substrate layer opaquely colored in some regions.

It goes without saying that in embodiments, the composite pane according to the invention can have further thermoplastic and/or functional layers, in addition to the first thermoplastic layer, the second thermoplastic layer, and the inlay element.

In a preferred embodiment of a composite pane according to the invention, the opaque layer or the opaquely colored region of the substrate layer is black. The opaque layer or the opaquely colored region of the substrate layer can, however, also be any other color. The opaque layer can be a layer colored all the way through or an imprinted layer or can be realized by an opaque coating.

A composite pane according to the invention can additionally include a masking print, in particular made of a dark, preferably black, enamel. Preferably, the opaque layer or the opaquely colored region of the substrate layer and the masking print have substantially the same optical density. The masking print is in particular a peripheral, i.e., frame-like, masking print. The peripheral masking print serves primarily as UV protection for the assembly adhesive of the composite pane. The masking print can be opaque and cover the entire surface. The masking print can be implemented semitransparent, at least in sections, for example, as a point grid, a strip grid, or a checkered grid. Alternatively, the masking print can also have a gradient, for example, from an opaque covering to a semitransparent covering.

"Substantially the same optical density" means that the optical densities of two materials differ from one another by at most 5%, preferably by 3%, particularly preferably by at most 2%.

In a preferred embodiment of a composite pane according to the invention, it includes a masking print that is the same color as the opaque layer or the opaquely colored region of the substrate layer.

The masking print is usually applied to the interior-side surface of the outer pane or to the interior-side surface of the inner pane.

Preferably, the inlay element is arranged between the outer pane and the inner pane such that, in the embodiments in which the inlay element comprises a substrate layer and an opaque layer, the opaque layer of the inlay element is arranged as directly adjacent the first thermoplastic intermediate layer as possible. In such an arrangement, in top view from the outside, the supply lines and connections of the optionally present at least one electrically conductive element are concealed by the opaque layer. Alternatively, the supply lines and connections can also be largely or completely embedded in the opaque layer.

The outer pane, the inner pane, the first thermoplastic intermediate layer, and the second thermoplastic intermediate layer can, independently of one another, be dear and colorless, but also tinted, frosted, or colored. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1. The outer pane and the inner pane can be made of non-tempered, partially tempered, or tempered glass. The thickness of the outer pane and the inner pane is typically from 0.3 mm to 5 mm, preferably from 1 mm to 3 mm, for example, 2.1 mm.

The composite pane is preferably curved in one or a plurality of spatial directions, as is customary for motor vehicle windows, with typical radii of curvature in the range from approx. 10 cm to approx. 40 m. The composite glass can, however, also be flat, for example, when it is intended as a pane for buses, trains, or tractors.

In a preferred embodiment, the composite pane is a vehicle composite pane, in particular a windshield.

In one embodiment, the composite pane is a windshield which is mirror-symmetrical along a center line, and the inlay element is arranged on the center line near the upper edge of the windshield.

"Near the upper edge" means, in particular, that the distance between the inlay element and the upper edge is at most 30 mm, preferably at most 20 mm, particularly preferably at most 15 mm, most particularly preferably at most 10 mm.

The optionally present at least one electrically conductive element can be connected to a voltage source. Each electrically conductive element can be connected to its own voltage source, or multiple electrically conductive elements can be connected to the same voltage source.

Usually used in the vehicle sector as a supply line for the contacting of electrically conductive elements in the interior of composite panes are foil conductors. Examples of foil conductors are described in DE 42 35 063 A1, DE 20 2004 019 286 U1, and DE 93 13 394 U1.

A further aspect of the invention is an arrangement comprising a composite pane according to the invention and an optical sensor applied thereon that is secured to the interior-side surface of the inner pane facing away from the second thermoplastic intermediate layer.

In one embodiment of this arrangement, the inlay element has a substrate layer and an opaque layer, and the opaque layer has a cutout which is, when looked through, arranged completely within the cutout in the inner pane. In this embodiment, the optical sensor is directed toward the region of the cutout in the opaque layer, i.e., the sensor window. The detection beam path of the sensor thus runs through the cutout in the opaque layer. The optical sensor is preferably an optical camera, in other words, a camera with sensitivity in the visible spectral range, for example, a lane camera or a camera for an augmented reality head-up display.

In another embodiment of this arrangement, the inlay element has a substrate layer which is opaquely colored in some regions and has a region which is excluded from the opaque coloring and is, when looked through, arranged completely within the cutout of the inner pane. In this embodiment, the optical sensor is directed toward the region of the substrate layer excluded from the opaque coloring, i.e., the sensor window. The detection beam path of the sensor thus runs through the region excluded from the opaque coloring. The optical sensor is preferably an optical camera, in other words, a camera with sensitivity in the visible spectral range, for example, a lane camera or a camera for an augmented reality head-up display.

In another embodiment of this arrangement, the inlay element has a substrate layer and an opaque layer, and the opaque layer is, at least in sections, transparent to infrared radiation with a wavelength in the range between 800 nm and 1560 nm, and the optical sensor is an infrared sensor or a light detection and ranging (LiDaR) sensor that is directed toward the section that is transparent to infrared radiation with a wavelength in the range between 800 nm and 1560 nm. The detection beam path of the sensor thus runs through the section in the opaque layer that is transparent to infrared radiation with a wavelength in the range between 800 nm and 1560 nm.

In another embodiment of this arrangement, the inlay element has a substrate layer which is opaquely colored in some regions, and the opaquely colored region of the substrate layer is, at least in sections, transparent to infrared radiation with a wavelength in the range between 800 nm and 1560 nm, and the optical sensor is an infrared sensor or a light detection and ranging (LiDaR) sensor that is directed toward the section that is transparent to infrared radiation with a wavelength in the range between 800 nm and 1560 nm. The detection beam path of the sensor thus runs through the section in the substrate layer that is transparent to infrared radiation with a wavelength in the range between 800 nm and 1560 nm.

The composite pane according to the invention meets the legal requirements with regard to fragment configurations in crash tests, for example, in accordance with ECE Regulation R43.

With a composite pane according to the invention, the refractive forces in the region of the sensor window are reduced by more than 50% compared to a composite pane in which the inner pane has no cutout in the region of the sensor window. Typical remaining refractive forces are in the range from 10 to 70 millidiopters (mdpt).

The invention also relates to a method for producing a composite pane, at least comprising the following steps:
(a) Providing an outer pane, an inner pane which has a cutout, a first thermoplastic intermediate layer, a second thermoplastic intermediate layer which has a cutout, and an inlay element;
(b) Arranging the first thermoplastic intermediate layer directly adjacent the outer pane, the second thermoplastic intermediate layer directly adjacent the inner pane, and the inlay element between the first thermoplastic intermediate layer and the second intermediate layer such that the cutout of the second thermoplastic intermediate layer is, when looked through, arranged completely within the region in which the inlay element is arranged, and the cutout of the inner pane is, when looked through, arranged completely within the cutout of the second thermoplastic intermediate layer; and
(c) Joining the outer pane to the inner pane by lamination via the first thermoplastic intermediate layer and the second thermoplastic intermediate layer.

The arranging of the inlay element between the first thermoplastic intermediate layer and the second thermoplastic intermediate layer can be done manually or mechanically, for example, by means of a robot.

If the inlay element has a substrate layer and an opaque layer that has a cutout, or if the inlay element has a substrate layer that is opaquely colored in some regions and has a region that is excluded from the opaque coloring, in step (b) of the method, the inlay element is arranged between the first thermoplastic intermediate layer and the second thermoplastic intermediate layer such that, when looked through, the cut out in the opaque layer or the part of the substrate layer opaquely colored in some regions excluded from the region of the opaque coloring is arranged completely within the cutout of the inner pane.

In embodiments of the method in which the inlay element has at least one electrically conductive element, the providing of the inlay element, i.e., the arranging of the substrate layer, the at least one electrically conductive element and, if present, the opaque layer can be done manually or mechanically, for example, by means of a robot. Appropriate inlay elements can be prefabricated and tested and then arranged in the connector line between the first and the second pane during production of the composite pane.

The at least one electrically conductive element can be processed, for example, using laser techniques, cutting methods, printing methods, etching methods, adhesive methods, chemical vapor deposition (CVD), physical vapor deposition (PVD), or atomic layer deposition (ALD).

If the composite pane is to have a curve, as is customary in particular for passenger cars, the panes are subjected to a bending process before lamination, for example, by gravity bending, suction bending, and/or press bending. Typical bending temperatures are from 500° C. to 700° C.

Preferably, before lamination and before the optional bending, an opaque masking print is applied, in particular to the edge region of the outer pane and/or the inner pane. For this, a black or dark enamel is typically applied by screen printing and baked before lamination, in particular before bending or during bending.

The invention also relates to the use of a composite pane according to the invention as a vehicle pane, preferably as a windshield of a motor vehicle.

The various embodiments of the invention can be implemented individually or in any combinations. In particular, the features mentioned above and explained in the following can be used not only in the combinations mentioned but also in other combinations or in isolation, without departing from the scope of the present invention.

In the following, the invention is explained in detail with reference to drawings and exemplary embodiments. The drawings are schematic representations and not to scale. The drawings in no way restrict the invention.

They depict:
FIG. 1 a plan view of an embodiment of the composite pane according to the invention,
FIG. 2 a detail of a cross-section through an embodiment of the composite pane according to the invention of FIG. 1 along the center line M,
FIG. 3 a detail of a cross-section through another embodiment of the composite pane according to the invention of FIG. 1 along the center line M,
FIG. 4 a detail of a cross-section through another embodiment of the composite pane according to the invention of FIG. 1 along the center line M,
FIG. 5 a detail of a cross-section through another embodiment of the composite pane according to the invention of FIG. 1 along the center line M,
FIG. 6 a detail of a cross-section through another embodiment of the composite pane according to the invention of FIG. 1 along the center line M,
FIG. 7 a detail of a cross-section through another embodiment of the composite pane according to the invention of FIG. 1 along the center line M,
FIG. 8 a plan view of an embodiment of an inlay element,
FIG. 9 a plan view of another embodiment of the composite pane according to the invention,
FIG. 10 a flowchart of an embodiment of the method according to the invention.

Figure 2:
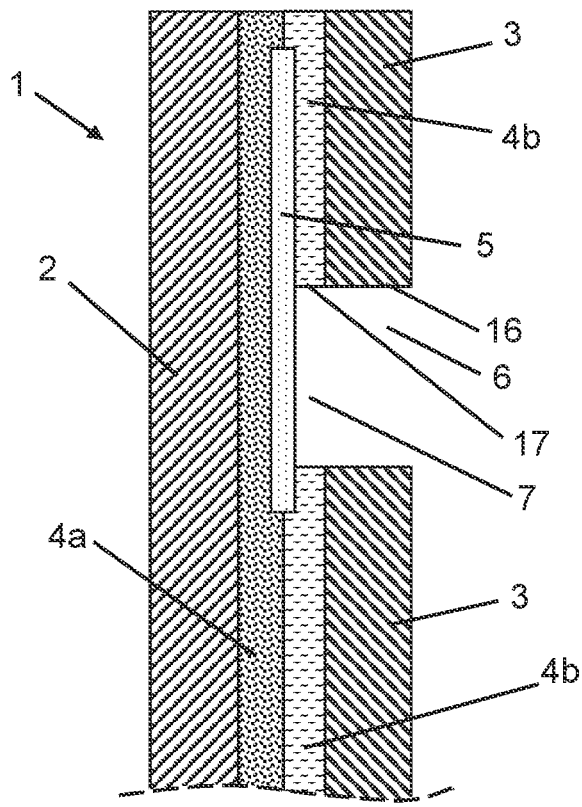

FIG. 1 depicts an embodiment of the composite pane 1 according to the invention, and FIG. 2 depicts the detail of a cross-section through an embodiment of the composite pane 1 according to the invention of FIG. 1 along the center line M. The composite pane 1 depicted in FIG. 1 is mirror-symmetrical along the center line M, and the functional inlay element 5 is arranged on the center line near the upper edge O.

In the embodiment depicted in FIGS. 1 and 2, the composite pane 1 comprises an outer pane 2 and an inner pane 3 that are joined to one another, surface to surface, via a first thermoplastic intermediate layer 4a arranged directly adjacent the outer pane 2 and a second thermoplastic intermediate layer 4b arranged directly adjacent the inner pane 3. The outer pane 2 and the inner pane 3 are made of soda lime glass and have, for example, a thickness of 2.1 mm. An inlay element 5 is arranged between the first thermoplastic intermediate layer 4a and the second thermoplastic intermediate layer 4b. The first thermoplastic intermediate layer 4a and the second thermoplastic intermediate layer 4b are made, in the embodiment depicted in FIGS. 1 and 2, of polyvinyl butyral (PVB) and are in each case 0.76 mm thick. The inlay element 5 has, in the embodiment depicted in FIGS. 1 and 2, a trapezoidal shape, wherein the corners pointing toward the lower edge are rounded. However, any other outer shape of the inlay element 5 suitable for masking sensors is possible. The second thermoplastic intermediate layer 4b has a cutout 7, wherein the cutout 7 is, when looked through, arranged completely within the region in which the inlay element 5 is arranged. The inner pane 3 has a cutout 6. This is, when looked through, arranged completely within the cutout 7 of the second thermoplastic intermediate layer 4b. In the embodiment depicted in FIG. 2, the inner edge 16 of the inner pane 3 and the inner edge 17 of the second thermoplastic layer 4b are, when looked through, arranged congruently one atop another. However, it is also possible for the cutout 7 in the second thermoplastic intermediate layer 4b to be larger than the cutout 6 in the inner pane, and the distance of the inner edge 17 of the second thermoplastic layer 4b from the inner edge 16 of the inner pane 3 is, for example, 5 mm.

Figure 3:
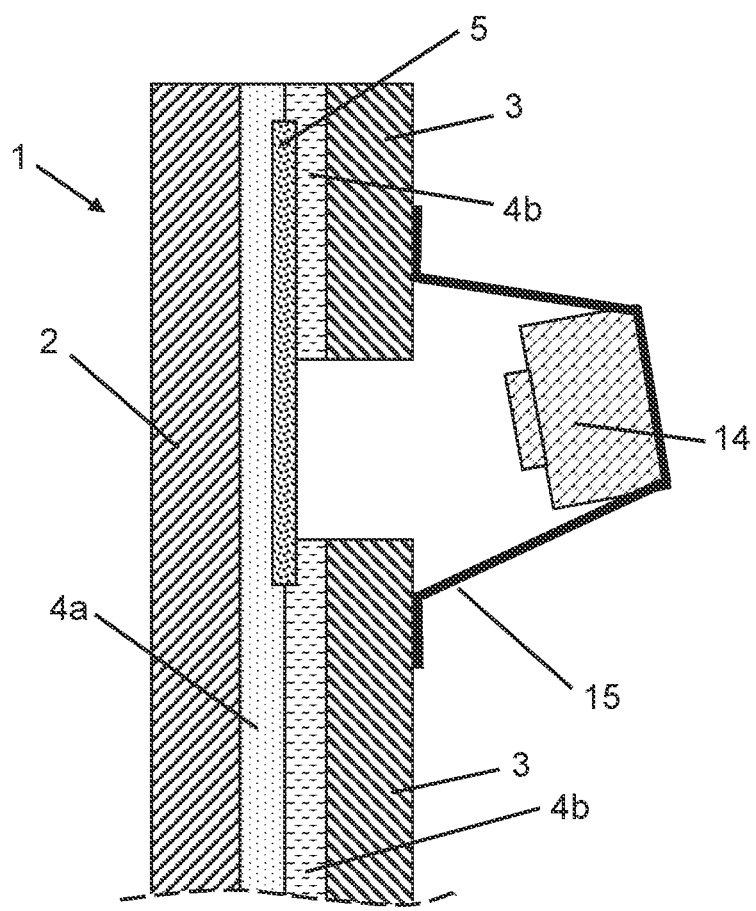

FIG. 3 depicts a detail of a cross-section through another embodiment of the composite pane according to the invention of FIG. 1 along the centerline M, which differs from the embodiment depicted in FIG. 2 only in that it additionally includes an optical sensor 14 that is attached to the inner pane 3 via a mount 15. The optical sensor is directed toward the cutout 6 (not provided with a reference character in FIG. 3) of the inner pane. The optical sensor 14 is, for example, a lane camera or a LIDAR sensor. The detection direction of the optical sensor 14 is directed forward roughly horizontally outside the composite pane 1. Radiation that passes horizontally through the vehicle composite pane 1 in a so-called sensor window is detected by the optical sensor 14.

Figure 4:
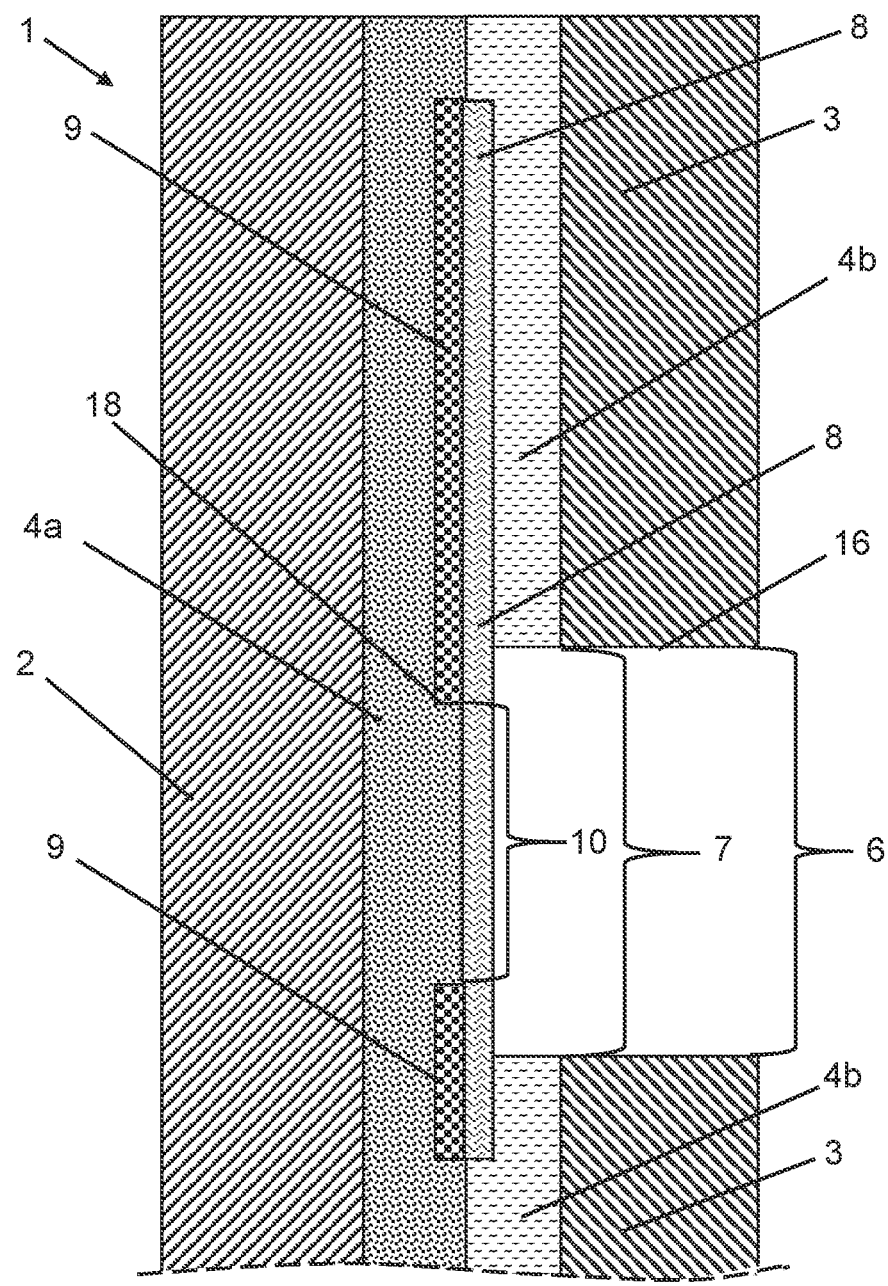

FIG. 4 depicts a detail of a cross-section through another embodiment of the composite pane according to the invention of FIG. 1 along the center line M, which differs from the embodiment depicted in FIG. 2 only in that it shows that the inlay element 5 has a substrate layer 8 and an opaque layer 9. The opaque layer 9 has a cutout 10 which is, when looked through, arranged completely within the cutout 6 of the inner pane 3. During lamination of the composite pane, the first thermoplastic intermediate layer 4a flows into the cutout 10 of the opaque layer 9. This is also the case in the embodiment depicted in FIG. 4. The distance of the inner edge 18 of the opaque layer 9 from inner edge 16 of the inner pane 3 is, for example, 10 mm. In the embodiment depicted in FIG. 4, the substrate layer 8 is, for example, a transparent PET film with a thickness of 60 μm; and the opaque layer 9, a PET film with a thickness of 50 μm.

Figure 5:
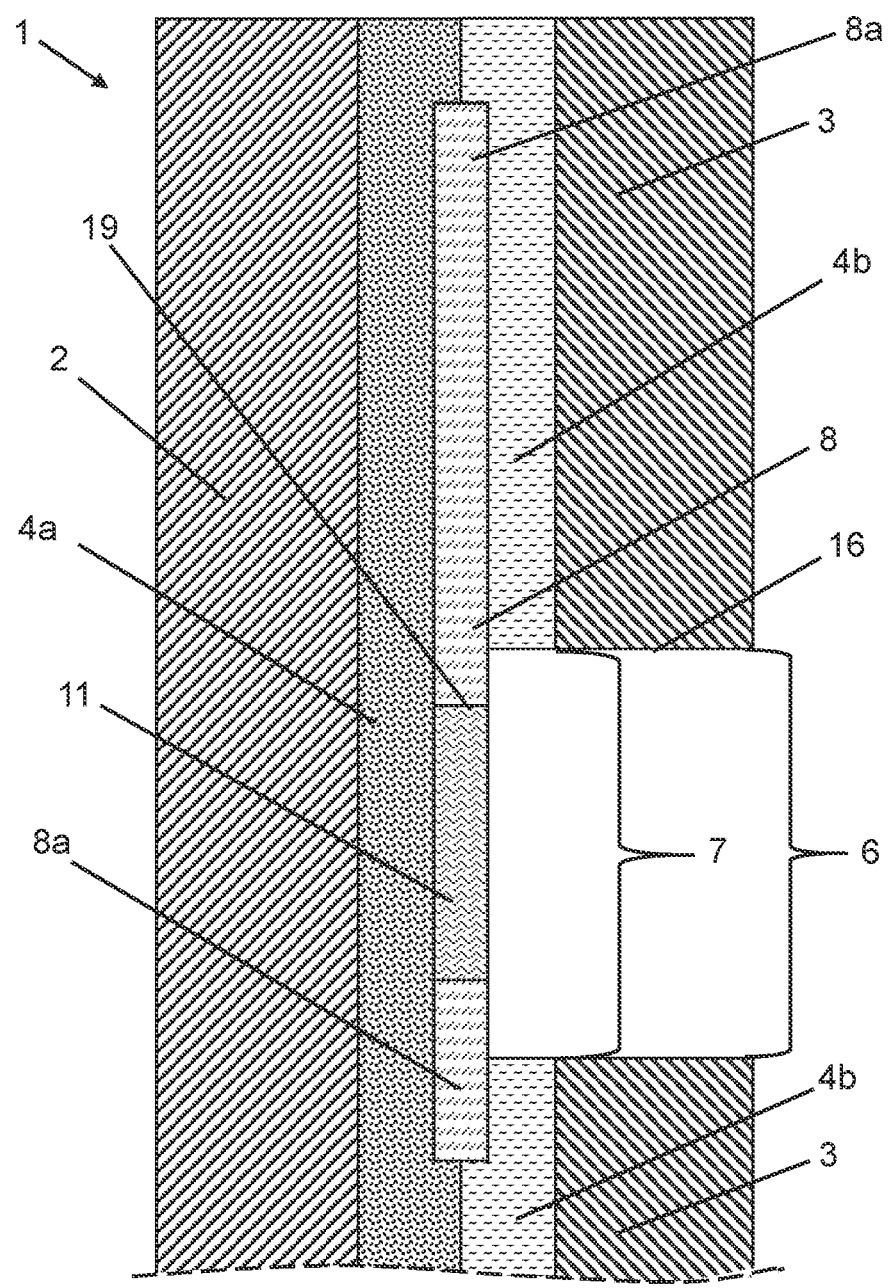

FIG. 5 depicts a detail of a cross-section through another embodiment of the composite pane according to the invention of FIG. 1 along the center line M which differs from the embodiment depicted in FIG. 2 only in that it shows that the inlay element 5 has a substrate layer 8 which is opaquely colored in some regions (the opaquely colored region is provided with the reference character 8a). The region 11 of the substrate layer that is excluded from the opaque coloring and is thus transparent is, when looked through, arranged completely within the cutout 6 of the inner pane 3. The distance of the inner edge 19 of the region 11 from the inner edge 16 of the inner pane 3 is, for example, 10 mm. In the embodiment depicted in FIG. 5, the substrate layer 8 is, for example, a PET film with a thickness of 80 μm.

Figure 6:
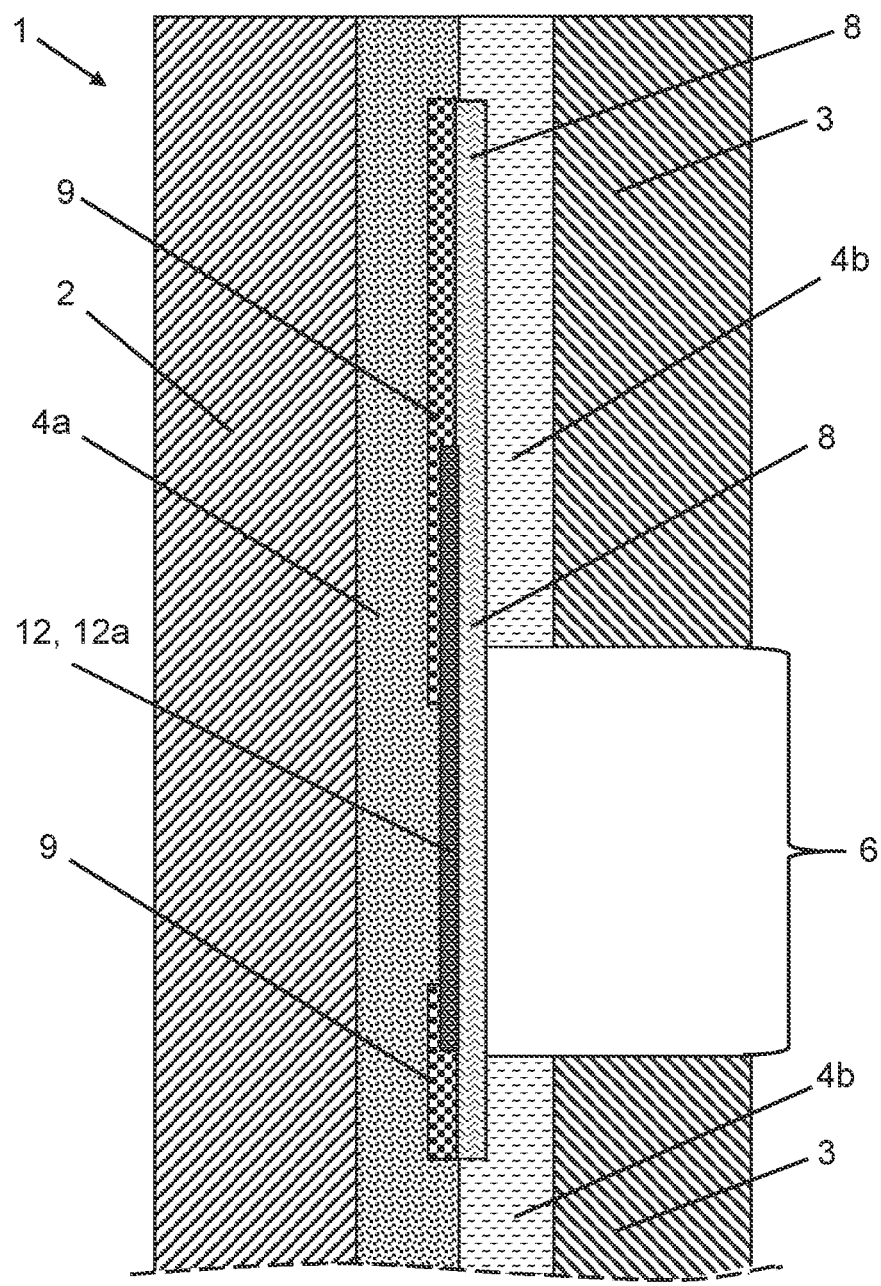

FIG. 6 depicts a detail of a cross-section through another embodiment of the composite pane according to the invention of FIG. 1 along the centerline M which differs from the embodiment depicted in FIG. 4 only in that the inlay element 5 additionally has an electrically conductive element 12 that is implemented as an electrically heatable layer 12a, The electrically conductive element 12 is arranged between the opaque layer 9 and the substrate layer 8. The electrically conductive element 12 is, in the embodiment depicted in FIG. 6, larger in terms of its outer dimensions than the cutout 6 in the inner pane 3. The electrically conductive layer 12 is arranged such that, when looked through, the cutout 6 in the inner pane 3 is arranged completely within the region in which the electrically conductive element 12 is arranged. The electrically conductive element 12 is, in the embodiment depicted in FIG. 6, an electrically conductive polymer, such as polyaniline with a thickness of 100 nm.

Figure 7:
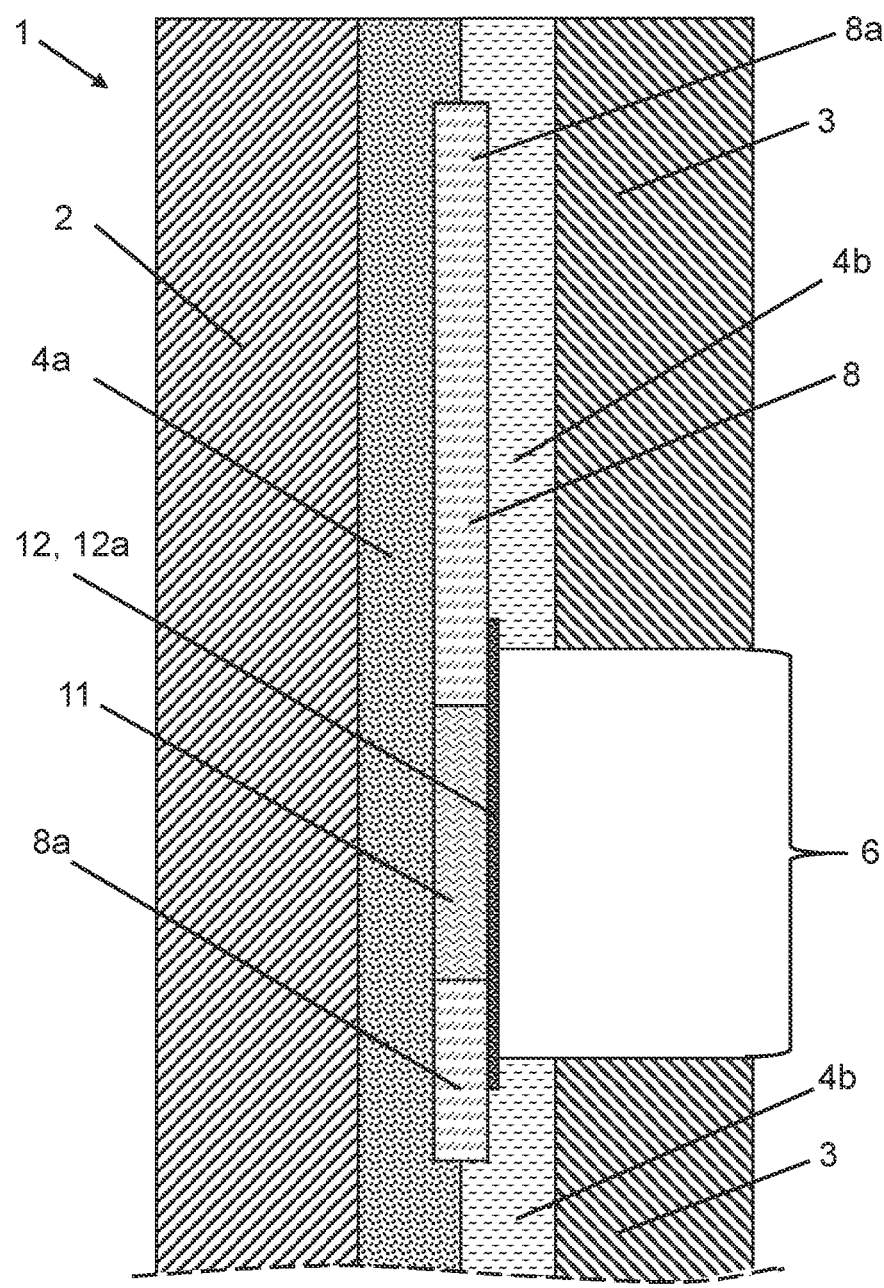

FIG. 7 depicts a detail of a cross-section through another embodiment of the composite pane according to the invention of FIG. 1 along the center line M which differs from the embodiment depicted in FIG. 5 only in that the inlay element 5 additionally has an electrically conductive element 12 that is implemented as an electrically heatable coating 12a. The electrically heatable coating 12a is applied on the substrate layer 8 in the direction of the inner pane 3. The electrically heatable coating 12a is, in the embodiment depicted in FIG. 7, larger in terms of its outer dimensions than the cutout 6 in the inner pane 3. The electrically heatable coating 12a is arranged such that, when looked through, the cutout 6 in the inner pane 3 is arranged completely within the region in which the electrically conductive element 12 in the form of an electrically heatable coating 12a is arranged. The electrically conductive element 12 is, in the embodiment depicted in FIG. 7, an ITO coating with a thickness of 50 nm applied on the substrate layer 8 opaquely colored in some regions.

Figure 8:
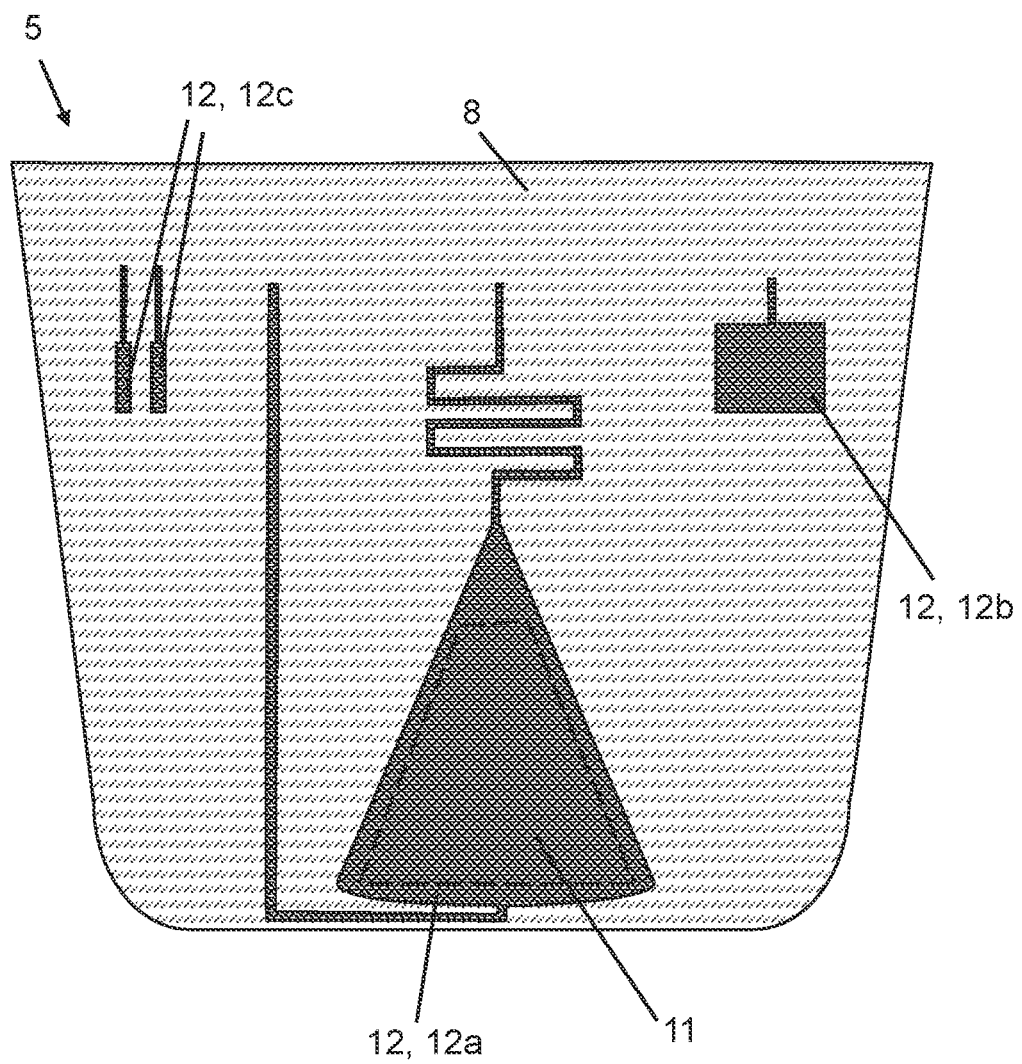

FIG. 8 depicts the plan view of an embodiment of an inlay element 5. In the embodiment of the inlay element 5 depicted in FIG. 8, it has a substrate layer 8 opaquely colored in some regions. The region 11, which is excluded from the opaque coloring and is thus transparent, is trapezoidal and, for better illustration, is bordered in FIG. 8 with a dashed line. In the embodiment of an inlay element 5 depicted in plan view in FIG. 8, the inlay element 5 has four electrically conductive elements 12. It is, however, also possible for the inlay element to have more or fewer electrically conductive elements 12. For better illustration, the electrically conductive elements 12 are shown patterned in FIG. 8. One of these electrically conductive elements 12 is a heatable element 12a implemented with a substantially triangular region with two lines extending therefrom. Another of these electrically conductive elements 12 is implemented as an antenna 12b, for example, a GPS antenna, with a substantially square region with one line extending therefrom. Two more of these electrically conductive elements 12 together are a moisture sensor 12c which is implemented as two substantially rectangular regions, each with one line extending therefrom. As is discernible from FIG. 8, the substantially triangular region of the heatable element 12a is slightly larger than the region 11 of the substrate layer 8 excluded from the opaque coloring and the region 11 excluded from the opaque coloring lies, when looked through, completely within the triangular region of the heatable element 12a.

Figure 9:
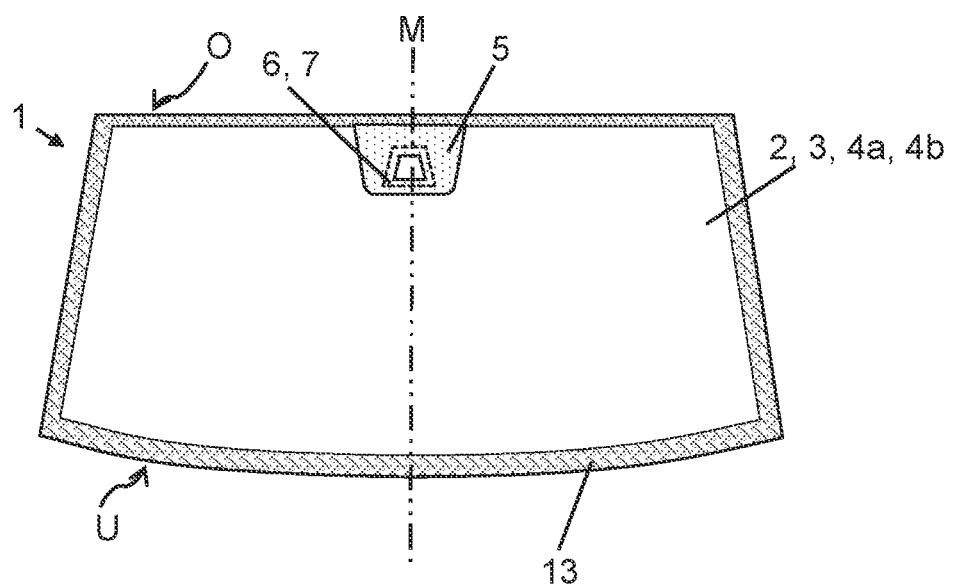

FIG. 9 depicts another embodiment of a composite pane 1 according to the invention. The composite pane 1 depicted in FIG. 9 differs from that depicted in FIG. 1 only in that it additionally includes a peripheral masking print 13 made of enamel. The opaque layer 9 or the opaquely colored region of the transparent substrate layer 8 of the inlay element 5 and the peripheral masking print 13 have substantially the same optical density and are, in the embodiment depicted in FIG. 13, shown patterned in each case. In the embodiment depicted in FIG. 9, the peripheral masking print 13 is applied only adjacent the outer edges of the composite pane 1. However, it is also possible for yet another masking print 13 to be additionally applied around the inlay element 5 on the outside.

Figure 10:
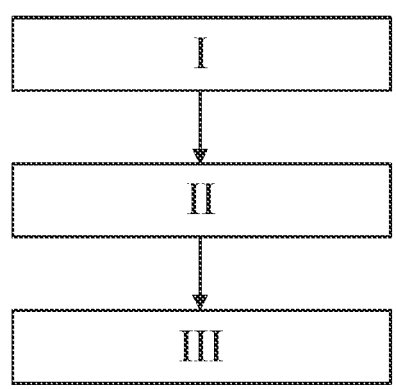

FIG. 10 shows the flow chart of a method according to the invention for producing a composite pane 1 according to the invention. In a first step I, an outer pane 2, an inner pane 3 which has a cutout 6, a first thermoplastic intermediate layer 4a, a second thermoplastic intermediate layer 4b which has a cutout 7, and an inlay element 5 are provided. In a second step II, the first thermoplastic intermediate layer 4a is arranged directly adjacent the outer pane 2, the second thermoplastic intermediate layer 4b is arranged directly adjacent the inner pane 3, and the inlay element 5 is arranged between the first thermoplastic intermediate layer 4a and the second intermediate layer 4b such that the cutout 7 of the second thermoplastic intermediate layer 4b is, when looked through, arranged completely within the region in which the inlay element 5 is arranged; and the cutout 6 of the inner pane 3 is, when looked through, arranged completely within the cutout 7 of the second thermoplastic intermediate layer 4b. In a third step III, the outer pane is joined to the inner pane 3 by lamination via the first thermoplastic intermediate layer 4a and the second thermoplastic intermediate layer 4b.

LIST OF REFERENCE CHARACTERS 1 composite pane
2 outer pane
3 inner pane
4a first thermoplastic intermediate layer
4b second thermoplastic intermediate layer
5 inlay element
6 cutout (in the inner pane)
7 cutout (in the second thermoplastic intermediate layer)
8 substrate layer
8a opaquely colored region of the substrate layer
9 opaque layer
10 cutout (in the opaque layer)
11 region (which is excluded from the opaque coloring)
12 electrically conductive element
12a electrically heatable element, electrically heatable layer, electrically heatable coating
12b antenna
12c moisture sensor
13 masking print
14 sensor
15 mount
16 inner edge of the inner pane
17 inner edge of the second thermoplastic intermediate layer
18 inner edge of the opaque layer
19 inner edge of the region 11
O upper edge/roof edge of the composite pane
U lower edge/engine edge of the composite pane
M center line

The invention claimed is:

1. A composite pane, comprising:
an outer pane and an inner pane which are joined to one another via a first thermoplastic intermediate layer arranged directly adjacent the outer pane and a second thermoplastic intermediate layer arranged directly adjacent the inner pane, and
an inlay element which is arranged in a region of the composite pane between the first thermoplastic intermediate layer and the second thermoplastic intermediate layer,
wherein the inner pane has a cutout and the second thermoplastic intermediate layer has a cutout, and the cutout of the second thermoplastic intermediate layer is, when looked through, arranged completely within the region in which the inlay element is arranged, and the cutout of the inner pane is, when looked through, arranged completely within the cutout of the second thermoplastic intermediate layer.

2. The composite pane according to claim 1, wherein the inlay element comprises a substrate layer and an opaque layer, and the opaque layer has a cutout which is, when looked through, arranged completely within the cutout of the inner pane.

3. The composite pane according to claim 2, wherein the substrate layer contains or consists of an electrically conductive polymer.

4. The composite pane according to claim 2, wherein the inlay element has at least one electrically conductive element.

5. The composite pane according to claim 4, wherein, independently of one another, the at least one electrically conductive element is implemented as an electrically heatable element, a moisture sensor, a pressure sensor, an antenna, or a carrier for electronic lines and components.

6. The composite pane according to claim 4, wherein the at least one electrically conductive element is an electrically conductive coating a carbon-containing layer, or a metallic layer or contains or consists of an electrically conductive polymer.

7. The composite pane according to claim 4, wherein the inlay element has at least two electrically conductive elements that are structured differently.

8. The composite pane according to claim 2, wherein the cutout in the opaque layer is a sensor window for an optical sensor.

9. The composite pane according to claim 2, wherein the substrate layer contains or consists of polyethylene terephthalate (PET), polymethyl methacrylate (PMMA), polypropylene (PP), or polyethylene (PE).

10. The composite pane according to claim 9, wherein the substrate layer contains or consists of polyethylene terephthalate (PET).

11. The composite pane according to claim 2, wherein the opaque layer contains or consists of polyethylene terephthalate (PET) or polyethylene (PE), ethylene vinyl acetate copolymer (EVA).

12. The composite pane according to claim 11, wherein the opaque layer contains or consists of polyethylene terephthalate (PET).

13. The composite pane according to claim 2, wherein, when looked through, at least in the region of the cutout, an electrically conductive element implemented as an electrically heatable element is arranged.

14. The composite pane according to claim 1, wherein the inlay element comprises a substrate layer which is opaquely colored in some regions and has a region which is excluded from the opaque coloring and is, when looked through, arranged completely within the cutout of the inner pane.

15. The composite pane according to claim 1, wherein the composite pane is a windshield that has an upper edge and a lower edge and is substantially mirror-symmetrical along a center line, and the inlay element is arranged on the centerline near the upper edge of the windshield.

16. The composite pane according to claim 14, wherein the region of the substrate layer excluded from the opaque coloring is a sensor window for an optical sensor.

17. The composite pane according to claim 14, wherein, when looked through, at least in the region of the substrate layer excluded from the opaque coloring, an electrically conductive element implemented as an electrically heatable element is arranged.

18. A method for producing a composite pane according to claim 1, comprising:

(a) providing an outer pane, an inner pane which has a cutout, a first thermoplastic intermediate layer, a second thermoplastic intermediate layer which has a cutout, and an inlay element;

(b) arranging the first thermoplastic intermediate layer directly adjacent the outer pane, the second thermoplastic intermediate layer directly adjacent the inner pane, and the inlay element between the first thermoplastic intermediate layer and the second intermediate layer are arranged such that the cutout of the second thermoplastic intermediate layer is, when looked through, arranged completely within the region, in which the inlay element is arranged, and, when looked through, the cutout of the inner pane is arranged completely within the cutout of the second thermoplastic intermediate layer; and (c) joining the outer pane is joined to the inner pane by lamination via the first thermoplastic intermediate layer and the second thermoplastic intermediate layer.

19. A method comprising utilizing a composite pane according to claim 1 as a vehicle pane.

20. The method according to claim 19, wherein the composite pane is a windshield of a motor vehicle.

* * * * *